Oct. 30, 1956     F. H. SMITH     2,768,832
SELF-ALIGNING TOOL HOLDER

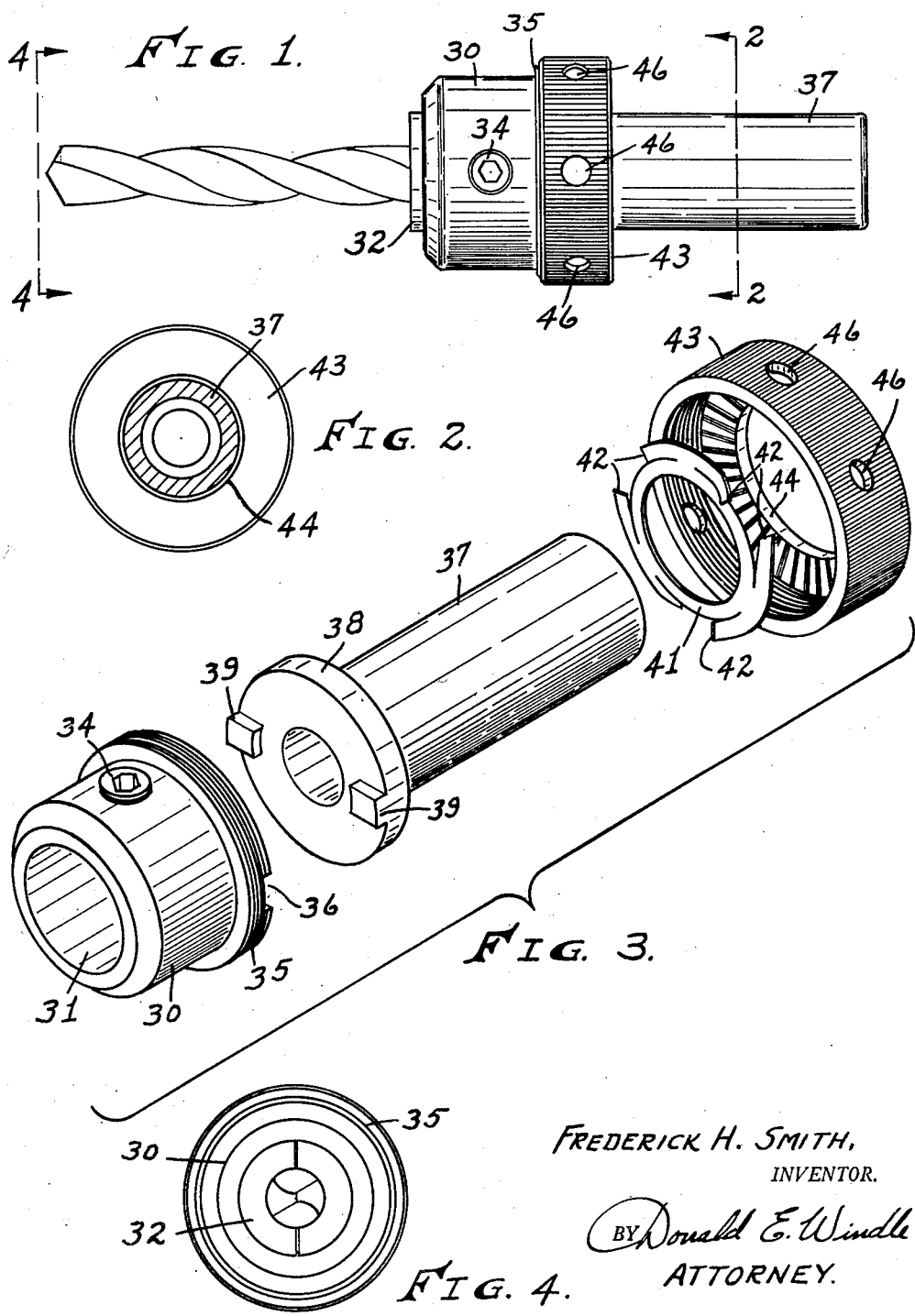

Filed Sept. 8, 1954     3 Sheets-Sheet 2

FREDERICK H. SMITH,
INVENTOR.

BY Donald E. Windle
ATTORNEY.

Oct. 30, 1956 — F. H. SMITH — 2,768,832
SELF-ALIGNING TOOL HOLDER
Filed Sept. 8, 1954 — 3 Sheets-Sheet 3

FREDERICK H. SMITH,
INVENTOR.
BY Donald E. Windle.
ATTORNEY.

United States Patent Office 2,768,832
Patented Oct. 30, 1956

2,768,832

SELF-ALIGNING TOOL HOLDER

Frederick H. Smith, Dayton, Ohio

Application September 8, 1954, Serial No. 454,705

7 Claims. (Cl. 279—16)

The present invention relates to self-aligning tool holders, better known to the trade as floating tool holders, for use in holding drills, reamers, taps, and other kindred tools, and is particularly adapted for use with screw machines and other like machines.

The principal object of the invention is the provision of a tool holder which is self-aligning in order to compensate for misalignment of the work with relation to the machine.

A second object is the provision of a self-aligning tool holder which is provided with adjustable floating means whereby the operator of the machine may adjust, to a certain degree, the tension between the parts thereof.

A third object is the provision of a self-aligning tool holder which is simple of operation and adjustment, and which accomplishes its purposes with a minimum number of parts.

Another object is the provision of a self-aligning tool holder which is simple of construction, and which is economical to manufacture.

Other particular objects and advantages of the invention will suggest themselves and become more apparent in the course of the following description, and that which is new will be set forth in the appended claims.

The preferred and most satisfactory manner of carrying out the principles of the invention in a practical and economical manner is shown in the accompanying drawings, in which:

Figure 1 is an elevational view of the tool holder showing a drill and its bushing positioned therein.

Figure 2 is a detail section through the shank portion of the tool holder, as taken on line 2—2 of Figure 1.

Figure 3 is an isometric detail of the parts of the tool holder.

Figure 4 is an end elevation of the tool holder, taken from line 4—4 of Figure 1.

Like characters of reference designate like parts throughout the several views.

Figure 5:
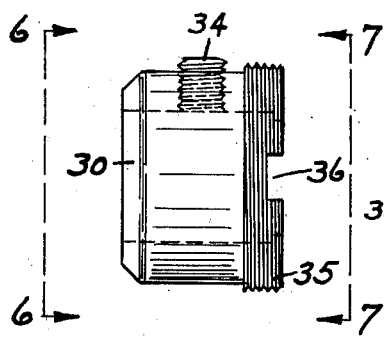
Figure 5 is an elevational view of the tool head member.
Figure 6:
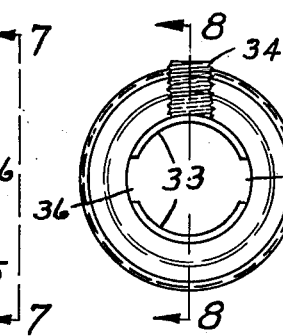
Figure 6 is a front end elevation of the tool head member, taken from line 6—6 of Figure 5.
Figure 7:
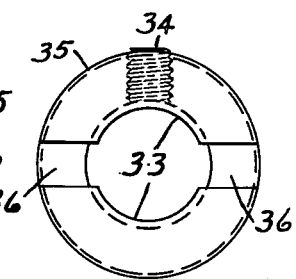
Figure 7 is a rear end view of the tool head member, taken from line 7—7 of Figure 5.
Figure 8:
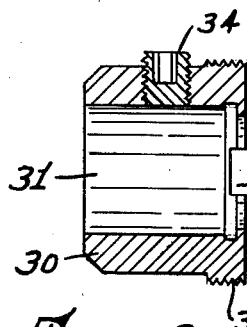
Figure 8 is a detail section through the tool head member, taken on line 8—8 of Figure 6.
Figure 9:
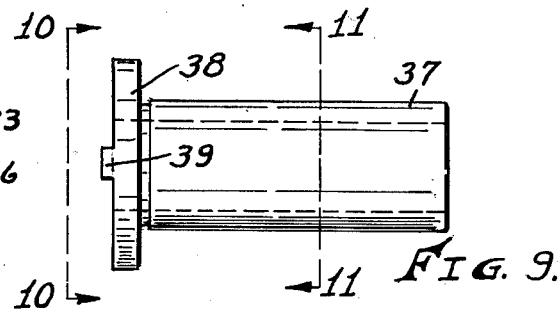
Figure 9 is an elevational view of the shank body member.
Figure 10:
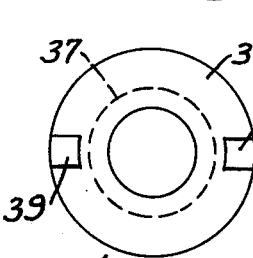
Figure 10 is a front end elevation of the shank body member, taken from line 10—10 of Figure 9.

In order that the invention may be more fully understood and appreciated, I will now take up a detailed description thereof, in which the same will be more fully set forth.

Referring now to the drawings in detail, numerals 30 designate the tool head member which has a bore 31 formed therethrough for the reception of tool bushing 32. A flange 33 is provided at the rear end of the bore 31 and provides a stop for the bushing 32. A set screw 34 is threaded through the wall of the tool head member and provides means rigidly securing the bushing member in the head member. A threaded flange 35 is formed on the rear portion of the tool head member for engagement therewith of connecting collar member. A pair of slots 36 are formed diametrically across the rear end of the head member, the purpose of which will be hereinafter set forth.

Figure 11:
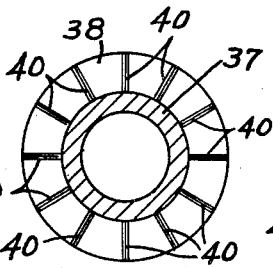
Figure 11 is a detail section through the shank, taken on line 11—11 of Figure 9.

37 designates the shank member which has a bore formed therethrough. A flange 38 is formed integrally with the forward end of the shank with a pair of lugs 39 being formed on the forward face of the shank flange 38. It will be noted that the lugs 39 are comparatively smaller than slots 36 of the tool head member. Serrations 40 are cut in the rearward face of shank flange 38, as more clearly shown in Figure 11, the purpose of which will be more fully set forth hereinafter.

Figures 12, 13:
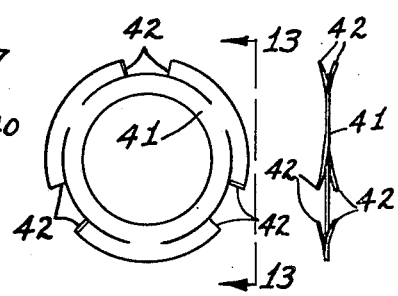
Figure 12 is an elevational view of the holder spring.
Figure 13 is an edge elevation of the holder spring, taken from line 13—13 of Figure 12.

A holder spring 41 has an aperture formed therethrough and with the body of the spring being cut or sheared to provide a series of engaging prongs 42 with the prongs being alternately directed forwardly and rearwardly, as more clearly shown in Figures 12 and 13.

Figures 14, 15:
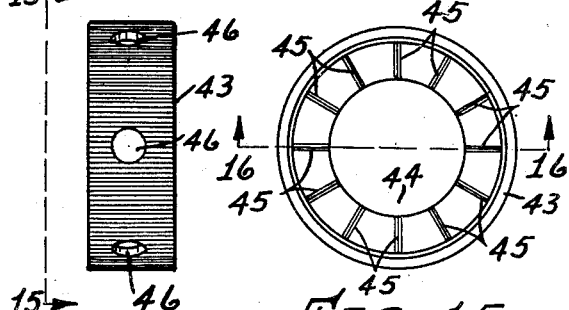
Figure 14 is a side elevation of the connecting collar member.
Figure 15 is a detail front elevation of the connecting collar, taken from line 15—15 of Figure 14.
Figure 16:
Figure 16 is a detail section through the connecting collar, taken on line 16—16 of Figure 15.
Figure 17:
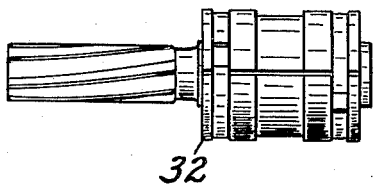
Figure 17 is a detail elevation of a bushing having a reamer positioned therein.
Figure 18:
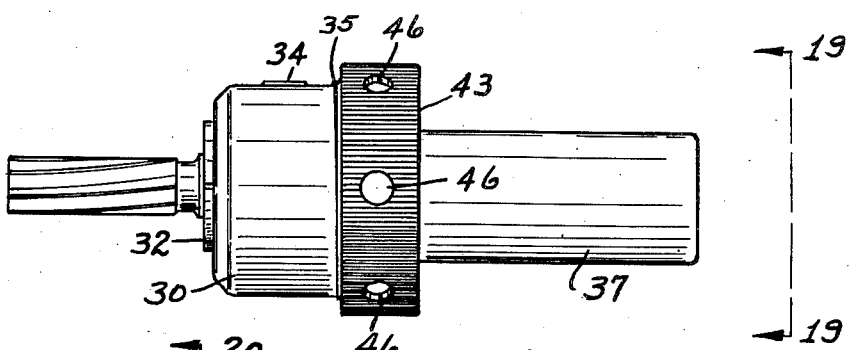
Figure 18 is a side elevation of the tool holder having the reamer and its bushing secured therein.
Figure 19:
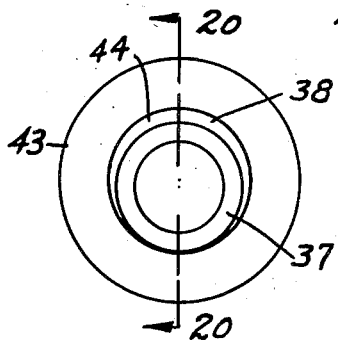
Figure 19 is a rear elevation of the tool holder, taken from line 19—19 of Figure 18, and showing the shank as being in misaligned relation with the tool head member and the connecting collar.
Figure 20:
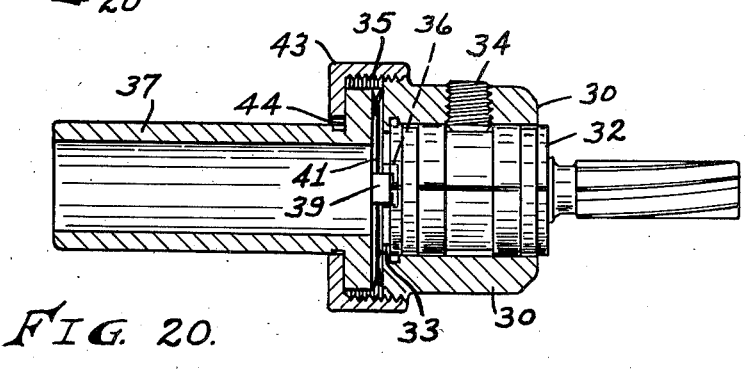
Figure 20 is a longitudinal section through the tool holder, as taken on line 20—20 of Figure 19.

An internally threaded connecting collar 43 is provided for securing the tool head member and the shank flange together. The connecting collar is provided with an aperture 44 through which shank 37 is adapted to project. Serrations 45 are cut in the collar, as shown in Figure 15.

In the assembly of the tool holder, the shank flange 38 is placed against the rear end of the tool head member, with lugs 39 being in loose register with slots 36. Spring 41 is then placed on the shank 37 with adjacent prongs 42 being in contacting relation with the rear side of shank flange 38, after which connecting collar 43 is passed onto shank 37 and threaded onto the threaded flange 35 of the tool head member. The connecting collar is threaded onto the threaded flange until the serrated surface of the connecting collar is in contact with the prongs of spring 41. The connecting collar is threaded onto the threaded portion of the tool head member and against the spring until the desired floating pressure is obtained between the shank and the tool head member. The prongs of the spring engage both the serrated surface of the tool and the serrations of the connecting collar member and prevent accidental loosening of the connecting collar with relation to the tool head member.

Apertures 46 are formed through the peripheral wall of the connecting collar for engagement therewith by a spanner type wrench.

It will be noted, by reference to Figures 8 and 9, and 7 and 10, that lugs 39 are considerably smaller than the slots 36, permitting movement of the tool head member with relation to the shank flange. Also, aperture 44 in the connecting collar is of sufficiently larger diameter than shank 37 to permit movement of the shank with relation to aperture 44. Also, the diameter of the shank flange 38 is smaller than the inside diameter of the connecting collar which permits floating motion of the shank flange with relation to the connecting collar.

In the use of the tool holder, the shank thereof is secured in the machine (not shown) and the bushing is inserted in the bore 31 of the tool head member, after which the desired drill, reamer, or tap is inserted in the bushing. The work is then brought into working contact with the tool. The end of the work is provided with a center, and the tool enters the center. Should the work not be in perfect alignment with the tool, the tool will, upon contact with the work, float into alignment with the center of the end of the work. With the floating motion of the tool to the exact center of the work, the tool head member moves with relation to the lateral position of the shank flange, and with the spring 41 providing frictional engagement between the tool head member and the shank flange. The spring 41 further provides means supporting the tool head member in its floated position and prevents the tool head from dropping down out of its alignment with the work. It is obvious that, when heavier tools are used in the tool head, sufficient friction is created between the tool head and the shank flange by tightening the collar 43.

The collar 43 provides means of adjusting the degree of frictional engagement between the tool head and the shank flange.

It is desired that it be understood that the preferred embodiment of the invention is shown in the drawings and described herein, but that the invention is not to be limited to the specific construction shown and described herein but that minor changes may be made therein insofar as the results of the changes may fall within the scope of the appended claims.

Having now shown and described the invention, what I claim, is:

1. In a tool holder, a shank having a serrated flange formed thereon, a tool head member, an internally serrated connecting collar, with the collar engaging the shank flange and threaded onto the head tool member, a pronged holder spring positioned between the shank flange and the connecting collar, and with the prongs of the holder spring engaging the serrations of the connecting collar and the serrated flange of the shank.

2. In a tool holder, a flanged shank member with the flange thereof being serrated, a tool head member adapted to set against the flanged shank member, an internally-serrated connecting collar adjustably securing the tool head member and the flanged shank member together, and with a pronged spring providing adjustable friction means between the tool head member and the flanged shank member.

3. In a tool holder, a shank having a serrated flange formed thereon, a serrated tool head member adjustably secured in frictional relation with the shank flange, a pronged spring providing frictional contact with the serrated flange of the shank, and means provided in the serrated tool head member for adjustably securing a tool bushing therein.

4. A tool holder comprising in combination, a tool head member having a bore formed therein and adapted to receive a tool bushing, means adapted to secure the tool bushing in the bore of the tool head member, slots formed in the rear end of the tool head member, a shank having a serrated flanged forward end, lugs formed on the forward face of the flanged forward end of the shank, with the lugs being adapted to loosely register with the slots formed in the rear end of the tool head member, and with a pronged spring washer providing an adjustable frictional contact of the rear end of the tool head member and the serrated flanged portion of the shank.

5. In a tool holder, a tool head member having an externally threaded portion formed on the rear end thereof, slots formed in the surface of the rear end of the tool head member, a shank having a flange formed on the forward portion thereof with the forward face of the flange being adapted to set against the rear face of the tool head member and with the rear face of the flange being serrated, a pair of lugs formed on the forward face of the flange and arranged to coincide with and extend into the slots of the tool head member, an internally serrated connecting collar fitting onto the shank and being threaded onto the rear portion of the tool head member, a pronged friction spring located on the shank between the rear side of the flange and the connecting collar, and with the pronged spring and the collar providing an adjustable frictional contact between the rear end of the tool head member and the forward face of the flange.

6. In a tool holder, a tool head member secured forwardly of a shank having a flange on the forward end thereof, an internally-serrated connecting collar fitting onto the shank and threaded onto the tool head member, a pronged spring positioned on the shank and located between the inner face of the connecting collar and the rear side of the flange of the shank, and with the pronged spring engaging the connecting collar and the rear side of the shank flange providing adjustable frictional contact between the rear surface of the tool head member and the forward face of the flange.

7. A tool holder as set forth in claim 6, with the tool head member being in floating relation with the shank and its flange, and with the contact of the pronged spring against the serrations of the connecting collar providing means maintaining the adjustment of the connecting collar with relation to the flange of the shank.

References Cited in the file of this patent

UNITED STATES PATENTS

| | | |
|---|---|---|
| 1,317,008 | Dohner et al. | Sept. 23, 1919 |
| 2,653,587 | Rasmussen et al. | Sept. 29, 1953 |